UNITED STATES PATENT OFFICE 2,296,677

CARDIO-ACTIVE SUBSTANCES AND PROCESSES FOR THEIR PRODUCTION

Wilhelm Küssner, Darmstadt, Germany, assignor to Merck & Co., Inc., Rahway, N. J., a corporation of New Jersey No Drawing. Application February 8, 1940, Serial No. 317,899. In Germany December 19, 1938

16 Claims. (Cl. 260—210)

This invention relates to cardio-active substances and to processes for their production.

The cardio-active glucosides and especially their genins have the disadvantage that they are very difficultly soluble. The glucosides, which usually undergoes splitting off of sugar residues during their preparation, are still further decomposed when administered orally due to fermentation in the digestive organs, whereby the resorption of these compounds is rendered so difficult, that, as a rule, intravenous application is required.

Efforts have previously been made to prepare synthetic derivatives of the natural products which would be more easily soluble in water and more stable. For example, it has been known to acylate K-strophanthidine and other cardio-active glucosides with various acids, but no real improvement in water solubility resulted.

Also, a process according to which cardio-active glucosides are converted with the aid of halides and other derivatives of poly-basic inorganic acids, especially phosphoric acid, into their ester acid salts, which are relatively easily soluble in water has been known. However, this process cannot be applied to genins of cardio-active glucosides, and has the further disadvantage that the thus obtained weakly acid compounds are only stable in neutral or alkaline solutions. In the presence of acids, for example, in the stomach, the acid esters which are very difficultly soluble in water again settle out. They are even less soluble and more difficultly resorbable than the original glucosides.

These difficulties are overcome by the present invention, according to which readily water soluble and chemically stable derivatives are prepared from cardiac poison glucosides as well as from their genins. The water solubility of the new compounds produced according to the present invention is maintained also in weakly acid solution, for example, in the gastric juice.

According to this invention, cardio-active glucosides or their genins are treated with halogen acid halides or halogen acid anhydrides to form halogen acid esters, which latter are condensed with secondary amines. The glucosides or their genins may be treated directly or may be dissolved in an inert solvent. When the conversion is complete, the halogen acid esters obtained can be isolated by crystallization from a suitable solvent and are then treated, either directly or in solution, with the secondary amines.

However, it is more practicable to omit the isolation of the halogen acid esters, which entails losses, and after neutralization of the resulting hydrohalide, to separate the reaction product from the solvent and from any possible excess of halogen acid halide by distillation, and then immediately treat it with the selected secondary amine. An excess of amine is preferably added to insure combination of all of the halogen acid. The formation of halogen acid esters with halogen acid anhydrides is preferably effected without the addition of solvents, and at temperatures somewhat above the melting point of the selected halogen acid anhydride.

According to another embodiment of the present invention, cardio-active acid esters are obtained by direct esterification of glucosides or their genins with amino acid halides. This conversion may be effected in an inert solvent in the presence of tertiary amines, such as, for instance, pyridine, while avoiding high temperatures.

The new compounds prepared according to this invention have the properties of alkaloids and, therefore, form salts with acids. As bases, they are insoluble in water and soluble in organic solvents, such as ether, benzene, ethyl acetate, and chloroform; as salts, on the other hand, they are soluble in water, but insoluble in the other solvents mentioned which are immiscible with water, so that they may be purified in a manner similar to alkaloids, by shaking. These compounds react with alkaloid reagents such as Mayers' reagent and Scheibler's reagent, picric acid solution and tannin solution, while forming precipitates which are insoluble in water.

The genins of the cardio-active glucosides combined with amino acids according to the present invention, are considerably more resistant to hydrolytic cleavage than in their original combination with sugar. Thus, in the case of 1% aqueous solution of K-strophanthidine diethylaminoacetic acid ester hydrochloride, it is not possible to chemically prove cleavage of the ester after heating for 24 hours at 90° C. in a sealed tube; by pharmacological method, a loss of activity of the substance of about 16% may be determined, which demostrates that the product of this invention has a much greater ability to resist cleavage than has strophanthin. The latter is known to be so sensitive to heating of its aqueous solution that in the preparation of strophanthin ampules, the usual one-hour steam sterilization must be avoided (see G. Stich, Bakteriologie, Serologie und Sterilisation im Apothekenbetrieb, 4th edition 1924, page 227). Pharmacological experiments have shown that the products of the present invention exhibit a high resistance to the action of stomach and intestinal ferments.

The following examples illustrate preferred embodiments of the invention as applied to the production of various cardio-active amino acid esters. It is to be understood, however, that these examples are given by way of illustration only, and that many modifications may be made therein without departing from the spirit and scope of the invention.

Example 1

About 1 gm. of K-strophanthidine is shaken at room temperature with 5 cc. chloracetyl chloride until it is dissolved. The solvent is then distilled off under vacuum, the residue is boiled under refluxing for about 2 hours with about 5 cc. of diethylamine and the excess diethylamine is distilled off. The residue is dissolved in 100 cc. of dilute hydrochloric acid. The aqueous solution is rendered alkaline with soda and shaken out four times with 100 cc. portions of ether. The ethereal solutions are filtered and distilled to about 50 cc. The K-strophanthidine-diethylaminoacetic acid ester separates out on standing in the form of crystals. It melts at 193–195° C.; its salts are soluble in water.

A pharmacological comparison of the K-strophanthidine ester thus obtained with K-strophanthidine and with K-strophanthin reveals the following:

The ester taken orally exhibits at least twice as strong action as K-strophanthin, in experiments with frogs; the ester exhibits an emetic action to a much lesser degree than strophanthin, in experiments with cats.

Compared with K-strophanthidine, the ester exhibits a 10-fold increase in activity in tests with frogs injected subcutaneously. If cats are given an infusion of 70% of the fatal dose and 24 hours later the dose that is then necessary to cause the animal's death is determined, it is found that 100% of the normal fatal dose is required for this purpose, and that the ester does not have cumulative properties.

It is also found that the ester is eliminated from the blood of the test animals considerably more quickly than is K-strophanthin.

Example 2

About 1 gm. of cymarin is boiled under refluxing for about one hour with 20 gms. of a 20% solution of chloracetic acid chloride in chloroform. The solution is cooled, treated with 1 cc. of diethylamine, and distilled under vacuum. The residue is boiled under refluxing for about one hour with an additional 5 cc. of diethylamine. The excess diethylamine is distilled off under vacuum, and the residue is dissolved in 100 cc. of dilute hydrochloric acid. The aqueous solution is made alkaline with soda, and is shaken out four times with 100 cc. portions of ether. The ethereal solutions are filtered and distilled off to about 50 cc. After standing in a cool place, cymarin diethylaminoacetic acid ester crystallizes out.

Example 3

About 1 gm. of digitoxigenin is boiled under refluxing for about one hour with 25 gms. of a 2% solution of chloracetic acid chloride in chloroform. Then, while cooling, 1 cc. of diethylamine is added and distilled under vacuum. The residue is boiled under refluxing for about one hour with an additional 5 cc. of diethylamine, and is distilled under vacuum. The residue is dissolved in 100 cc. of dilute hydrochloric acid. The solution is made alkaline with soda and is extracted four times with 100 cc. portions of ether. The ethereal solutions are filtered and distilled to 25 cc. On standing in a cool place, digitoxigenin-diethylaminoacetic acid ester crystallizes out. It melts at 177–178° C.; its salts are soluble in water.

Example 4

About 1 gm. gitoxigenin is boiled under refluxing for two hours with 50 gm. of a 2% solution of chloracetic acid chloride in chloroform. The solution is distilled under vacuum. The residue is taken up in 5 cc. methanol and mixed with 10 cc. piperidine. The mixture is refluxed on the steam bath for one hour and is then distilled under vacuum. The residue is dissolved in 100 cc. of dilute hydrochloric acid. The solution is made alkaline with soda and is extracted four times with 50 cc. portions of chloroform. The chloroformic solutions are filtered and evaporated to dryness. There remains gitoxigenin-bis-piperidoacetic acid ester in an amorphous form. It is easily soluble in water.

Example 5

About 1 gm. gitoxigenin is boiled under refluxing for two hours with 50 gm. of a 2% solution of chloracetic acid chloride in chloroform. Then the solution is distilled off under vacuum. The residue is heated on the steam bath for one hour with 5 cc. of 2-methylamino-n-butane, and is then distilled under vacuum. The residue is dissolved in 100 cc. of dilute hydrochloric acid. The solution is made alkaline with soda and the precipitated insoluble base is filtered off by suction, washed with water, and dried. The base, gitoxigenin-bis-methylbutyl-amino-acetic acid ester is easily soluble in acidulated water.

Example 6

About 1 gm. of gitoxigenin is dissolved in 5 cc. of pyridine and the solution is diluted with 100 cc. of chloroform. This gitoxigenin solution while cooled, is mixed with a solution of 2.5 gm. α-bromopropionyl bromide in 50 cc. of chloroform. The mixture is allowed to stand at room temperature for one hour and is then distilled under vacuum. The residue is boiled under refluxing for 1½ hours with 10 cc. of diethylamine; then the excess diethylamine is distilled under vacuum. The residue is covered with 100 cc. water and enough 25% hydrochloric acid is added to just turn Congo paper blue. The resulting solution is filtered and is then made alkaline with sodium carbonate solution (litmus paper blue). The gitoxigenin-bis-diethylaminopropionic acid ester settles out as amorphous flakes; it is filtered off by suction, washed with water, and dried. It is easily soluble in acidulated water.

Example 7

About 1 gm. gitoxin is ground with 1 gm. chloracetic acid anhydride and is then heated at 60° C. for twenty hours. The greenish, clear melt is boiled under refluxing for two hours with 10 cc. of diethylamine. The excess diethylamine is then distilled off under vacuum and the residue is dissolved in 100 cc. of dilute hydrochloric acid. The solution is rendered alkaline with sodium carbonate and is shaken out four times with 100 cc. portions of ether. The ether solution is filtered to dryness and distilled. There remains an amorphous product the diethylaminoacetic acid ester of gitoxin; it is easily soluble in water.

Example 8

About 10 gms. K-strophanthidine is boiled under refluxing for two hours with 250 gm. of a 2% solution of chloracetyl chloride in chloroform. Then the solution is shaken in a separating funnel with 1% aqueous sodium bicarbonate solution, until the acid that has developed is completely eliminated. The chloroform solution is separated, distilled, and the residue is taken up warm in 50 cc. of methanol. On standing in a cool place, the chloracetic acid ester of K-strophanthidine, with a melting point of 235° C., crystallizes out. It is filtered off by suction and dried. By boiling this ester for two hours with excess diethylamine, it can be converted into the K-strophanthidine-diethylamino-acetic acid ester, which can be purified by recrystallization from acetic acid ethyl ester, and which is identical with the product obtained according to Example 1.

Example 9

About 1 gm. gitoxigenin is dissolved in 5 cc. of pyridine, and this solution is diluted with 100 cc. of chloroform. Then 2.5 gm. nicotinic acid chloride hydrochloride is added and is shaken until it is dissolved. The solution is kept in a closed vessel for 72 hours, at room temperature. Then it is distilled under vacuum, and the residue is mixed with 200 cc. water and sufficient 25% hydrochloric acid to make the reaction just acid to Congo. The acid solution is shaken vigorously and any remaining undissolved particles are filtered off. The filtrate is alkalized with soda until it turns litmus paper blue, and the flocculent gitoxigenin nicotinic acid ester precipitate is filtered by suction, washed with water, and dried.

I claim:

1. A compound selected from the group consisting of tertiary amino lower fatty acid esters of cardio-active glucosides and tertiary amino lower fatty acid esters of genins of cardio-active glucosides.
2. Tertiary amino lower fatty acid esters of cardio-active glucosides.
3. Tertiary amino lower fatty acid esters of genins of cardio-active glucosides.
4. K-strophanthidine diethylaminoacetic acid ester.
5. Cymarin diethylaminoacetic acid ester.
6. Digitoxigenin diethylaminoacetic acid ester.
7. The process comprising treating a substance selected from the group consisting of cardio-active glucosides and their genins with a substance selected from the group consisting of halogen lower fatty acid halides and halogen acid anhydrides, and condensing the reaction product with secondary amines.
8. The process comprising reacting a substance selected from the group consisting of cardio-active glucosides and their genins in an inert solvent with halogen lower fatty acid halides, isolating the halogen acid ester thus produced by crystallization, and condensing it with a secondary amine.
9. The process comprising treating a substance selected from the group consisting of cardio-active glucosides and their genins with halogen lower fatty acid halides in an inert solvent, neutralizing, separating the reaction product from the solvent and any excess halogen acid halide by distillation, and condensing it with a secondary amine.
10. The process comprising reacting a substance selected from the group consisting of the cardio-active glucosides and their genins with halogen lower fatty acid anhydride at temperatures higher than the melting point of the selected halogen acid anhydride, and condensing the reaction product with a secondary amine.
11. The process comprising reacting K-strophanthidine with a substance selected from the group consisting of halogen lower fatty acids halides, and holagen lower fatty acid anhydrides, and condensing the reaction product with diethylamine.
12. The process comprising reacting cymarin with a substance selected from the group consisting of halogen lower fatty acid halides and lower fatty acid anhydrides and condensing the reaction product with diethylamine.
13. The process comprising reacting K-strophanthidine with chloracetyl chloride, and condensing the reaction product with diethylamine.
14. The process comprising reacting digitoxigenin with a substance selected from the group consisting of halogen lower fatty acid halides and halogen lower fatty acid anhydrides, and condensing the reaction product with diethylamine.
15. The process comprising reacting cymarin with chloracetyl chloride, and condensing the reaction product with diethylamine.
16. The process comprising reacting digitoxigenin with chloracetyl chloride, and condensing the reaction product with diethylamine.

WILHELM KÜSSNER.

CERTIFICATE OF CORRECTION.

CERTIFICATE OF CORRECTION.

Patent No. 2,296,677.　　　　　　　　　　　　　　September 22, 1942.

WILHELM KÜSSNER.

It is hereby certified that error appears in the printed specification of the above numbered patent requiring correction as follows: Page 1, first column, line 6, for the word "undergoes" read --undergo--; page 3, second column, line 29, claim 11, for "acids" read --acid--; line 36, claim 12, before "lower" insert --halogen--; and that the said Letters Patent should be read with this correction therein that the same may conform to the record of the case in the Patent Office.

Signed and sealed this 27th day of October, A. D. 1942.

(Seal)　　　　　　　　　　　　　　　　　　　　Henry Van Arsdale,
　　　　　　　　　　　　　　　　　　　　Acting Commissioner of Patents.